US009814056B2

(12) United States Patent
Wang et al.

(10) Patent No.: US 9,814,056 B2
(45) Date of Patent: Nov. 7, 2017

(54) METHODS AND APPARATUS FOR INTERFERENCE MANAGEMENT OF WIRELESS LINKS WITH OVERRIDING LINK PRIORITY

(71) Applicant: QUALCOMM Incorporated, San Diego, CA (US)

(72) Inventors: Hua Wang, Basking Ridge, NJ (US); Junyi Li, Chester, NJ (US); Tingfang Ji, San Diego, CA (US); Naga Bhushan, San Diego, CA (US)

( * ) Notice: Subject to any disclaimer, the term of this patent is extended or adjusted under 35 U.S.C. 154(b) by 92 days.

(21) Appl. No.: 15/048,829

(22) Filed: Feb. 19, 2016

(65) Prior Publication Data

US 2017/0064724 A1    Mar. 2, 2017

Related U.S. Application Data

(60) Provisional application No. 62/209,156, filed on Aug. 24, 2015.

(51) Int. Cl.
    *H04W 72/10*      (2009.01)
    *H04W 72/14*      (2009.01)
    *H04W 72/08*      (2009.01)
    *H04W 72/12*      (2009.01)
    *H04W 72/04*      (2009.01)
    *H04W 92/20*      (2009.01)

(52) U.S. Cl.
    CPC ......... *H04W 72/10* (2013.01); *H04W 72/082* (2013.01); *H04W 72/1242* (2013.01); *H04W 72/1247* (2013.01); *H04W 72/1268* (2013.01); *H04W 72/1273* (2013.01); *H04W 72/14* (2013.01); *H04W 72/0446* (2013.01); *H04W 72/1231* (2013.01); *H04W 92/20* (2013.01)

(58) Field of Classification Search
CPC ............ H04W 72/10; H04W 72/1247; H04W 72/1268; H04W 72/1273; H04W 72/14; H04W 72/082
See application file for complete search history.

(56) References Cited

U.S. PATENT DOCUMENTS

| 8,068,444 B2 | 11/2011 | Brunel et al. |
| 8,155,032 B2 | 4/2012 | Lindoff et al. |
| 8,315,234 B2 | 11/2012 | Sohrabi |

(Continued)

FOREIGN PATENT DOCUMENTS

| EP | 2683207 A1 | 1/2014 |
| WO | WO-2014110981 A1 | 7/2014 |
| WO | WO-2014113941 A1 | 7/2014 |

OTHER PUBLICATIONS

International Search Report and Written Opinion—PCT/US2016/043942—ISA/EPO—dated Oct. 10, 2016.

(Continued)

*Primary Examiner* — Charles C Jiang
*Assistant Examiner* — Thad Defauw
(74) *Attorney, Agent, or Firm* — Qualcomm IP Dept.; James Hunt Yancey, Jr.

(57) ABSTRACT

Aspects of the present disclosure relate to methods and apparatus for interference management of wireless links with overriding link priority. The switched wireless link or connection may have lower or higher priority than the non-switched or scheduled link. The priority order between the links may be overridden in certain conditions.

28 Claims, 13 Drawing Sheets

(56) References Cited

U.S. PATENT DOCUMENTS

| | | |
|---|---|---|
| 2005/0058149 A1 | 3/2005 | Howe |
| 2013/0343336 A1* | 12/2013 | Bai .................... H04W 72/082 370/329 |
| 2014/0153454 A1* | 6/2014 | Samdanis ........... H04W 52/243 370/280 |
| 2014/0301252 A1* | 10/2014 | Choi ...................... H04B 7/265 370/278 |
| 2014/0369221 A1* | 12/2014 | Fu ........................... H04L 5/006 370/252 |
| 2015/0023145 A1* | 1/2015 | Kim ..................... H04L 5/1469 370/201 |
| 2015/0215107 A1* | 7/2015 | Siomina .................... H04L 5/16 370/281 |
| 2015/0365941 A1* | 12/2015 | Liu .................. H04W 72/0446 370/280 |
| 2015/0373677 A1* | 12/2015 | Seo ..................... H04W 72/042 370/330 |
| 2016/0242125 A1* | 8/2016 | Lee ..................... H04W 52/246 |
| 2016/0286558 A1* | 9/2016 | Chae .................... H04L 5/0055 |

OTHER PUBLICATIONS

Samsung: "Deployment and interference scenarios for TDD eIMTA", 3GPP Draft; R1-130288 Deployment and Interference Scenarios for TDD EIMTA, 3rd Generation Partnership Project (3GPP), Mobile Competence Centre; 650, Route Des Lucioles; F-06921 Sophia-Antipolis Cede, vol. RAN WG1, No. St Julian; Jan. 28, 2013-Feb. 1, 2013, Jan. 19, 2013, XP050663634, Retrieved from the Internet: URL:http://www.3gpp.org/ftp/tsg_ran/WG1_RL1/TSGR1_72/Docs/ [retrieved on Jan. 19, 2013].

* cited by examiner

METHODS AND APPARATUS FOR INTERFERENCE MANAGEMENT OF WIRELESS LINKS WITH OVERRIDING LINK PRIORITY

RELATED APPLICATIONS

This application claims priority to and the benefit of Provisional Patent Application No. 62/209,156, filed on Aug. 24, 2015 with the United States Patent and Trademark Office, the entire content of which is incorporated herein by reference.

TECHNICAL FIELD

The technology discussed below relates generally to wireless communication systems, and more particularly, interference management of wireless links with overriding link priority.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

In various wireless communication systems, multiple wireless links, connections, or carriers may be utilized for uplink and/or downlink communications. Uplink communication generally refers to signal transmission from a user equipment to a base station. Downlink communication generally refers to signal transmission from a base station to a user equipment. When the frequencies of two wireless links are the same or close to each other, transmissions on one wireless link may cause undesirable interference to the other wireless link. Hence, interference management is an important aspect in wireless communication systems. In some wireless communication systems, the wireless links may be associated with a priority order. Therefore, when there are several interfering wireless links, low priority wireless link(s) may yield to the high priority link(s) based on their relative priority. In general, a low priority link yields to a high priority link if the low priority link may cause significant or undesirable interference to the high priority link.

BRIEF SUMMARY OF SOME SAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects of the present disclosure relate to methods and apparatus for interference management of wireless links with overriding link priority. The switched or reconfigured wireless link or connection may have lower or higher priority than the non-switched or scheduled link. In some aspects of the disclosure, the priority order between the links may be overridden in certain conditions per subframe or transmission time interval.

One aspect of the present disclosure provides for a method of wireless communication utilizing a first scheduling entity. According to the method, the first scheduling entity communicates with a first user equipment (UE) via a first connection during a subframe in a communication transmission. The first scheduling entity reconfigures the first connection to reverse a payload data direction of the first connection during the same subframe, such that a link priority of the reconfigured first connection is lower than that of a second connection between a second scheduling entity and a second UE. The first scheduling entity transmits a priority override signal to the second scheduling entity to modify the link priority of the reconfigured first connection to be higher than that of the second connection during the subframe, such that a transmission of the reconfigured first connection has priority over the second connection when an interference between the second connection and reconfigured first connection.

Another aspect of the present disclosure provides for a method of wireless communication utilizing a first user equipment. According to the method, the first user equipment (UE) communicates with a first scheduling entity via a first connection during a subframe in a communication transmission. The first UE reconfigures the first connection to reverse a payload data direction of the connection during the same subframe, such that a link priority of the reconfigured first connection is lower than that of a second connection between a second scheduling entity and a second UE. The first UE transmits a priority override signal to the second UE to modify the link priority of the reconfigured first connection to be higher than that of the second connection during the subframe, such that a transmission of the reconfigured first connection has priority over the second connection during an interference between the second connection and reconfigured first connection.

Another aspect of the present disclosure provides for a first scheduling entity configured for wireless communication. The first scheduling entity includes a communication interface configured to communicate with a first user equipment (UE), a memory configured to store executable code, and at least one processor operatively coupled to the communication interface and memory. The processor is configured by the executable code to communicate with the first UE via a first connection during a subframe in a communication transmission. The processor is further to reconfigure the first connection to reverse a payload data direction of the first connection during the same subframe, such that a link priority of the reconfigured connection is lower than that of a second connection between a second scheduling entity and a second UE. The processor is configured to transmit a priority override signal to the second scheduling entity to modify the link priority of the reconfigured first connection to be higher than that of the second connection during the subframe, such that a transmission of the reconfigured first connection has priority over the second connection during an interference between the second connection and reconfigured first connection.

Another aspect of the present disclosure provides for a first user equipment (UE) configured for wireless communication. The first UE includes a communication interface configured to communicate with a first scheduling entity; a memory configured to store executable code, and at least one processor operatively coupled to the communication interface and memory. The processor is configured to communicate with the first scheduling entity via a first connection during a subframe in a communication transmission. The processor is configured to reconfigure the first connection to reverse a payload data direction of the first connection during the same subframe, such that a link priority of the reconfigured first connection is than that of a second connection between a second scheduling entity and a second UE. The processor is configured to transmit a priority override signal to the second UE to modify the link priority of the reconfigured first connection to be higher than that of the second connection during the subframe such that a transmission of the reconfigured first connection has priority over the second connection during an interference between the second connection and the reconfigured first connection.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatuses and methods. These apparatuses and methods will be described in the following detailed description and illustrated in the accompanying drawings by various blocks, modules, components, circuits, steps, processes, algorithms, etc. (collectively referred to as "elements"). These elements may be implemented using electronic hardware, computer software, firmware, or any combination thereof. Whether such elements are implemented as hardware or software depends upon the particular application and design constraints imposed on the overall system.

Figure 1:
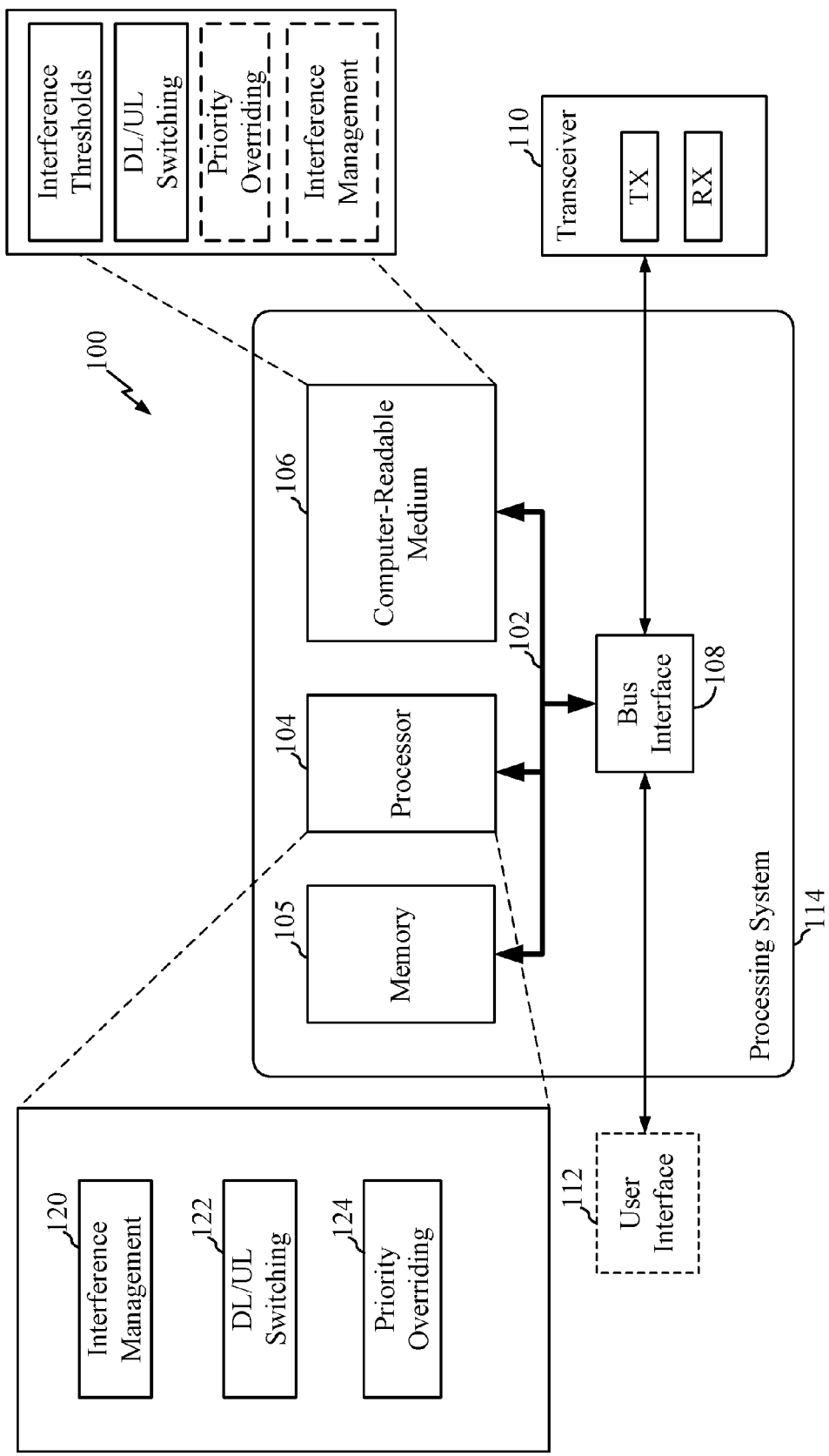
FIG. 1 is a diagram illustrating an example of a hardware implementation for an apparatus employing a processing system in accordance with some aspects of the disclosure.

FIG. 1 is a diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104 In some examples, the apparatus 100 may be a user equipment (UE) as illustrated in any one or more of FIGS. 2-4 and 7. In other examples, the apparatus 100 may be a base station as illustrated in any one or more of FIGS. 2-4 and 7. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 104, as utilized in an apparatus 100, may be used to implement any one or more of the processes or procedures described below and illustrated in FIGS. 4,7, and 10-13.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well-known in the art, and therefore, will not be described any further. A bus interface 108 provides an interface between the bus 102 and a transceiver 110. The transceiver 110 provides a means for communicating with various other apparatus over a transmission medium. For example, the transceiver 110 may include one or more receivers (RX) and transmitters (TX) for communicating with other wireless devices. Depending upon the nature of the apparatus, a user interface 112 (e.g., keypad, display, speaker, microphone, joystick, touchscreen, touchpad) may also be provided.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, computer executable code, programs, subprograms, software modules, applications, software applications, software packages, routines, subroutines, objects, executables, threads of execution, procedures, functions, etc., whether referred to as software, code, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD), Blu-ray disk (BRD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 104 may include an interference management block 120, a downlink/uplink (DL/UL) switching block 122, a priority overriding block 124, and other circuitry, which may be configured to perform the various functions and processes described in relation to FIGS. 4-13. In one aspect of the disclosure, the software stored at the computer-readable medium 106 includes computer executable code. For example, the code includes DL/UL switching code, priority overriding code, and interference management code for configuring the processor 104. The interference management block 120 may be configured to perform processes for determining interference at a base station and/or a UE due to interference from a nearby communication link between a UE and a base station. In one example, the interference may be a signal-to-interference ration (SIR).

The DL/UL switching block 122 may be configured to perform processes for switching a scheduled downlink (DL) connection to a switched uplink (UL) connection, or a scheduled UL connection to a switched DL connection, in a subframe or time slot. The priority overriding block 124 may be configured to perform processes for overriding a priority of a DL or UL connection relative to another DL/UL connection. A scheduled DL connection denotes a connection or communication link between a base station and a UE initially setup to be DL during a certain time period (e.g., transmission time interval (171), time slot, or subframe). A scheduled UL connection denotes a connection or communication link between a base station and a UE initially setup to be UL during a certain time period (e.g., TTI, time slot, subframe). A switched UL connection denotes a scheduled DL connection in a certain time period that is repurposed or switched to an UL connection (switched UL) during at least a portion of the same time period. A switched DL connection denotes a scheduled UL connection in a certain time period that is repurposed or switched to a DL connection (switched DL) during at least a portion of the same time period.

The processor 104 is also responsible for managing the bus 102 and general processing, including the execution of software stored on the computer-readable medium 106. The software, when executed by the processor 104, causes the processing system 114 to perform the various functions described below for any particular apparatus. The computer-readable medium 106 may also be used for storing data that is manipulated by the processor 104 when executing software. For example, the data may include interference thresholds and algorithms for determining the interference between communication links.

Figure 2:
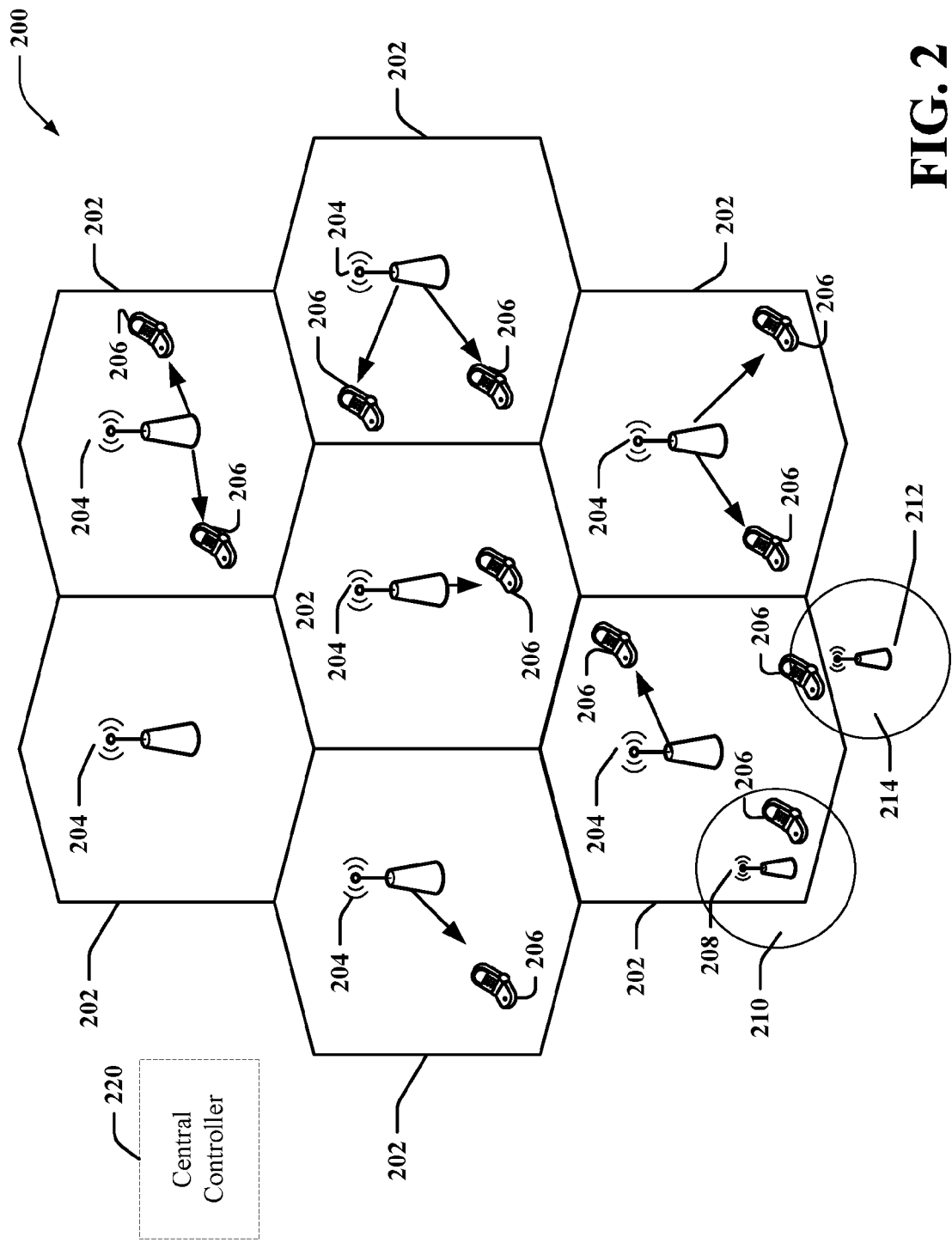
FIG. 2 is a diagram illustrating an example of a wireless access network in accordance with an aspect of the disclosure.

FIG. 2 is a diagram illustrating an example of a wireless access network in accordance with an aspect of the disclosure. In this example, the wireless access network 200 is divided into a number of cellular regions (cells) 202. One or more lower power class base stations 208, 212 may have cellular regions 210, 214, respectively, that overlap with one or more of the cells 302. The lower power class base stations 208, 212 may be femto cells (e.g., home eNode Bs (HeNBs)), pico cells, or micro cells. A higher power class or macro base station 204 (e.g., eNode B) is assigned to a cell 202 and is configured to provide an access point to all the UEs 206 in the cell 202. The base stations 204 and UEs 206 may be implemented using the apparatus 100 of FIG. 1. In some aspects of the disclosure, a centralized controller 220 may be used in alternative configurations. The base station 204 may be responsible for all radio related functions including radio bearer control, admission control, mobility control, scheduling, security, link priority, interference management, and connectivity to a serving gateway (not shown in FIG. 2). When the centralized controller 220 is used, it may provide one or more communication channels between the base stations, and the controller 220 may be responsible for some radio related functions including radio bearer control, admission control, mobility control, scheduling, security, link priority, interference management, and connectivity to a serving gateway.

The modulation and multiple access scheme employed by the access network 200 may vary depending on the particular telecommunications standard being deployed. In some aspects of the disclosure, frequency division duplexing (FDD) and/or time division duplexing (TDD) may be used for the uplink (UL) and downlink (DL) connections. In a specific example, the base stations and UEs may communicate using TDD UL and DL connections. Some of the neighbor base stations may communicate with their corresponding UEs in the same traffic direction (DL or UL) (i.e., synchronized in traffic direction in the same subframe Under certain conditions, a DL/UL connection may be switched to an UL/DL connection in a certain time period, subframe or time slot.

As those skilled in the art will readily appreciate from the detailed description to follow, the various concepts presented herein may be readily extended to other telecommunication standards employing various modulation and multiple access techniques. By way of example, these concepts may be extended to Evolution-Data Optimized (EV-DO) or CDMA2000. EV-DO and CDMA2000 are air interface standards promulgated by the 3rd Generation Partnership Project 2 (3GPP2) as part of the CDMA2000 family of standards, and employ CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. In some examples, the described link interference management techniques may be extended to fifth generation (5G) networks. The actual wireless communication standard and the multiple access technology employed will depend on the specific application and the overall design constraints imposed on the system.

Figure 3:
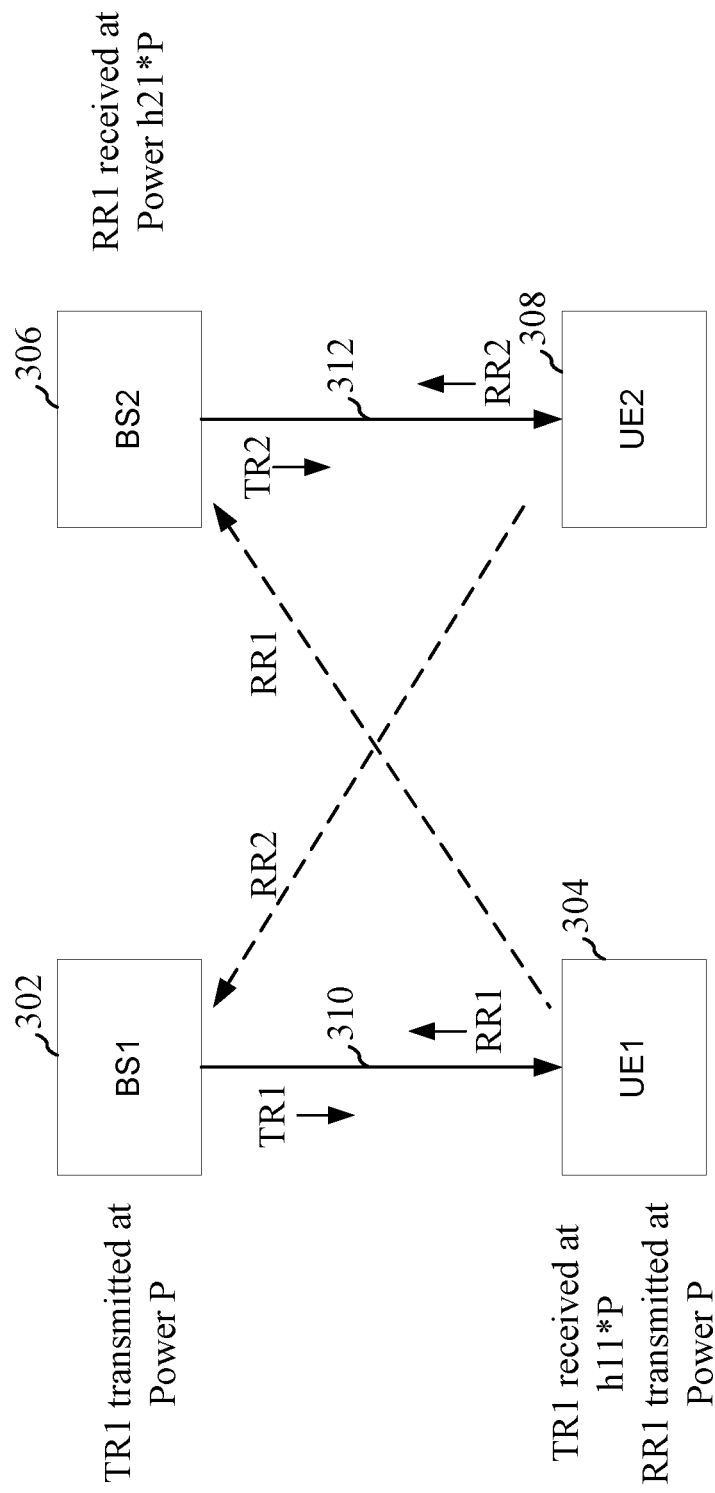
FIG. 3 is a block diagram illustrating two base stations in communication with two user equipments and interference management between communication links in accordance with an aspect of the disclosure.

FIG. 3 is a block diagram illustrating two base stations in communication with their corresponding UEs and interference between communication links in accordance with an aspect of the disclosure. In some examples, a base station may be called a scheduling entity, and a UE may be called a subordinate or scheduled entity. In a scheduling process, the scheduling entity determines the resources to be allocated or assigned to support the desired communication link or connection between the scheduling entity and a subordinate entity. This process may be called scheduling and may be performed by sending a pre-scheduling block or request to the subordinate entity per TTI, subframe, time slot, or any suitable time interval. The subordinate entity, in response to the pre-scheduling block, may send a scheduling response back to the scheduling entity to complete the scheduling process. The concept of FIG. 3 is not limited to communication between base stations and UEs. In other aspects of the disclosure, the concept may be implemented with peer-to-peer (P2P) devices and mesh networks. In P2P communication and mesh networks, devices can communicate with each other without involving a base station, a central controller, or similar network devices. A P2P device or mesh network device may be configured as a scheduling entity, subordinate entity or both.

In a certain subframe or time slot, a first base station 302 may have a scheduled DL connection 310 with a first UE 304, and a second base station 306 may have a scheduled DL connection 312 with a second UE 308. The base stations and UEs of FIG. 3 may be any of the base stations and UEs illustrated in FIGS. 1 and 2. In this example, the communication link (connection) between the first base station 302 and the first UE 304 may be a high priority link (first link 310), and the communication link between the second base station 306 and the second UE 308 may be a low priority link (second link 312) relative to the first link 310. In other examples, the relative priority may be different (e.g., reversed). In general, data transmission on the low priority link may yield to the high priority link under certain interference conditions.

To determine the interference from a transmitter (e.g., second base station 306) of the low priority link to a receiver of the high priority link (e.g., first UE 304), a pair of transmitter request signals (e.g., TR1 and TR2) and receiver response signals (e.g., RR1 and RR2) may be exchanged between the transmitters (e.g., BS1 and BS2) and receivers (e.g., UE1 and UE2). Each of the first base station 302 and second base station 306 may include a transmitter (e.g., transceiver 110 of FIG. 1) configured to transmit a transmitter request (TR) signal. Each of the first UE 304 and second UE 308 may include a receiver (e.g., transceiver 110 of FIG. 1) configured to receive the transmitter request signals. In one example, the base station 302 transmits a transmitter request signal (e.g., TR1) to the UE 304, and the UE 304 can determine its direct link received power (DLRP) based on the received TR1. The determined DLRP indicates the power of the signal (TR1) received at the UE from its associated base station. The first UE 304 transmits a receiver response (e.g., RR1) to the first base station 302, and the RR1 carries the information of the DLRP. For example, the RR1 may carry a quantized version of DLRP. The transmitter (e.g., base station 306) of the low priority link can then determine its interference to the receiver (e.g., UE 304) of the high priority link by receiving and measuring the RR1 of the high priority link.

In one example, the first link 310 has a higher priority than the second link 312. The first base station 302 may transmit a first transmitter request (TR1) to the first UE 304, and the second base station 306 may transmit a second transmitter request (TR2) to the second UE 308. The TR1 and TR2 may be transmitted at a certain power P or a predetermined power. In some examples, the TR1 and TR2 may be transmitted at different power levels. The first UE 304 receives the TR1 and measures the DLRP as $h_{11}*P$ (i.e., a fraction of P, where $h_{11}$ is a value between 0 and 1). The first UE 304 then transmits a receiver response (RR1) at the power P or a predetermined power. The RR1 includes information of the DLRP. For example, the RR1 may carry an encoded value (a quantized or digitized value) of the DLRP.

The second base station 306 may receive the RR1 of the first UE 304 at a power $h_{21}*P$ ($h_{21}$ is a value between 0 and 1). That is, the power of the RR1 received by the second base station 306 is equal to $h_{21}*P$ (i.e., a fraction of P). From the received RR1, the second base station 306 may determine the first link's DLRP (e.g., $h_{11}*P$). Therefore, if the first base station 302 and second base station 306 both transmit at the same time or simultaneously, it can be determined that the first UE 304 will have a signal-to-interference ratio (SIR) of $h_{11}/h_{21}$. Accordingly, the second base station 306 of the lower priority link can determine whether or not it may transmit based on the SIR. For example, the second base station 306 may transmit if the SIR is greater a certain value (e.g., a predetermined value). Similar operations may be performed for the DL connection 310 using TR2 and RR2 to determine an SIR at the second UE 308, if the relative priority of the links are reversed. In other aspects of the disclosure, similar operations may be performed at the base station or UE to determine the interference between two links or connections for different UL and DL combinations and relative priority.

In one aspect of the disclosure, nearby cells may be synchronized in traffic direction initially. For example, for each subframe, time slot, or TTI of a TDD network, nearby cells (e.g., BS1 302 and BS2 306) may be configured for either uplink (UL) or downlink (DL). However, there are scenarios that a traffic direction may be switched (e.g., UL-to-DL switch or DL-to-UL switch) during a subframe, time slot, or TTI. For example, if a cell or base station has no DL data for a certain DL subframe, then the base station may switch the scheduled DL to a switched UL to increase spectral efficiency. Similar switching may be made from UL to DL. However, this DL-to-UL or UL-to-DL switch may introduce interference patterns that need to be considered and managed.

Figure 4:
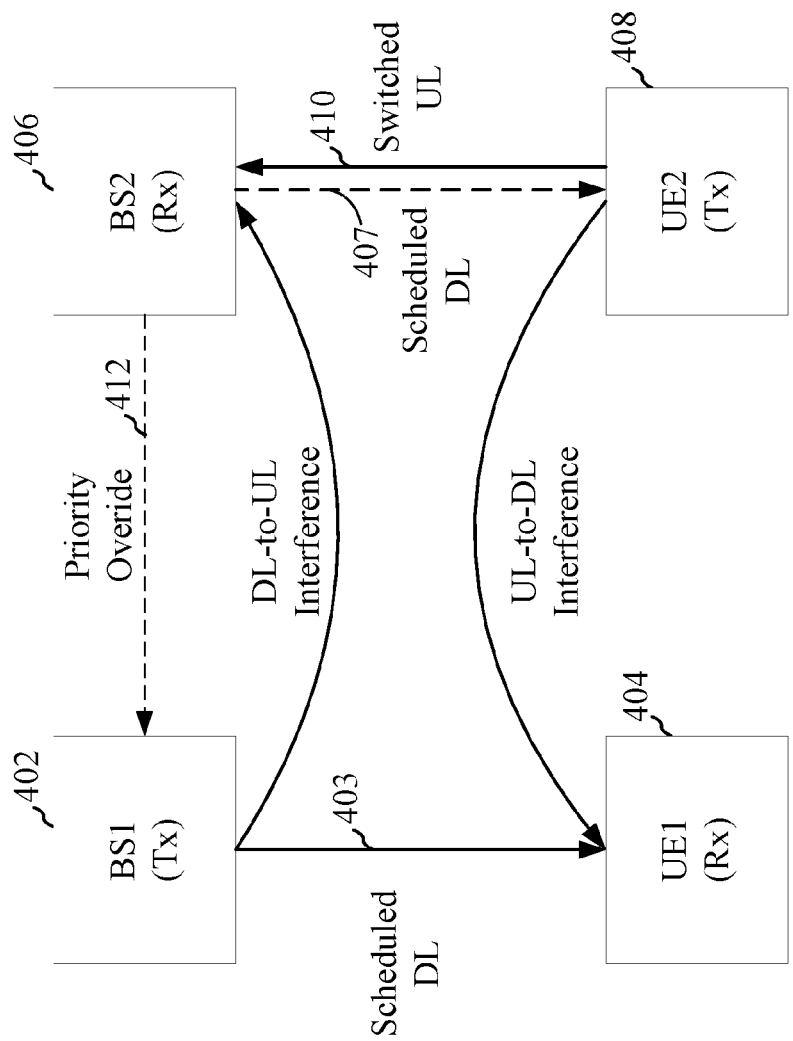
FIG. 4 is a diagram illustrating an example of downlink (DL) and uplink (UL) switching and priority management in accordance with some aspects of the disclosure.

FIG. 4 is a diagram for illustrating an example of DL and UL switching and link priority management in accordance with various aspects of the disclosure. In a certain subframe, TTI, or time slot, a first base station 402 has a scheduled (non-switched) downlink connection 403 with a first UE 404, and a second base station 406 has a scheduled DL connection 407 with a second UE 408. Under certain conditions, the scheduled DL connection 407 may be switched to an UL connection 410 (switched UL). For example, the second base station 406 may not have DL data for transmission during that subframe so that DL-to-UL switching may be performed to increase spectral efficiency. In this example, the DL-to-UL switching may cause certain DL-to-UL interference and UL-to-DL interference between the base stations and UEs. In one aspect of the disclosure, the first base station 402 may know about the DL-to-UL switch at the second base station 406 from an override signal 412 if the second base station 406 is of high priority. If the second base station 406 is of low priority, the first base station 402 may not need to monitor the DL-to-UL switch at BS2 406.

In another example, the first base station 402 may have an UL-to-DL switched downlink connection with the first UE 404, and the second base station 406 has a scheduled (non-switched) uplink connection with the second UE 408. Similarly, the UL-to-DL switching may cause DL-to-UL interference and UL-to-DL interference between the base stations and UEs. In one aspect of the disclosure, the switched link or connection may have lower or higher priority than the non-switched or scheduled link. In some aspects of the disclosure, the priority order between the links may be overridden in certain conditions. In some examples, if a low priority link has mission critical data, time-sensitive, or other high priority data to transmit in a certain time slot or subframe, the high priority link with delay tolerant data or low priority data may yield to the low priority link (i.e., priority overridden). Throughout this disclosure, link and connection denote a wireless communication connection between two wireless entities (e.g., BS and UE), and these terms may be used interchangeably unless expressly stated otherwise.

Figure 5:
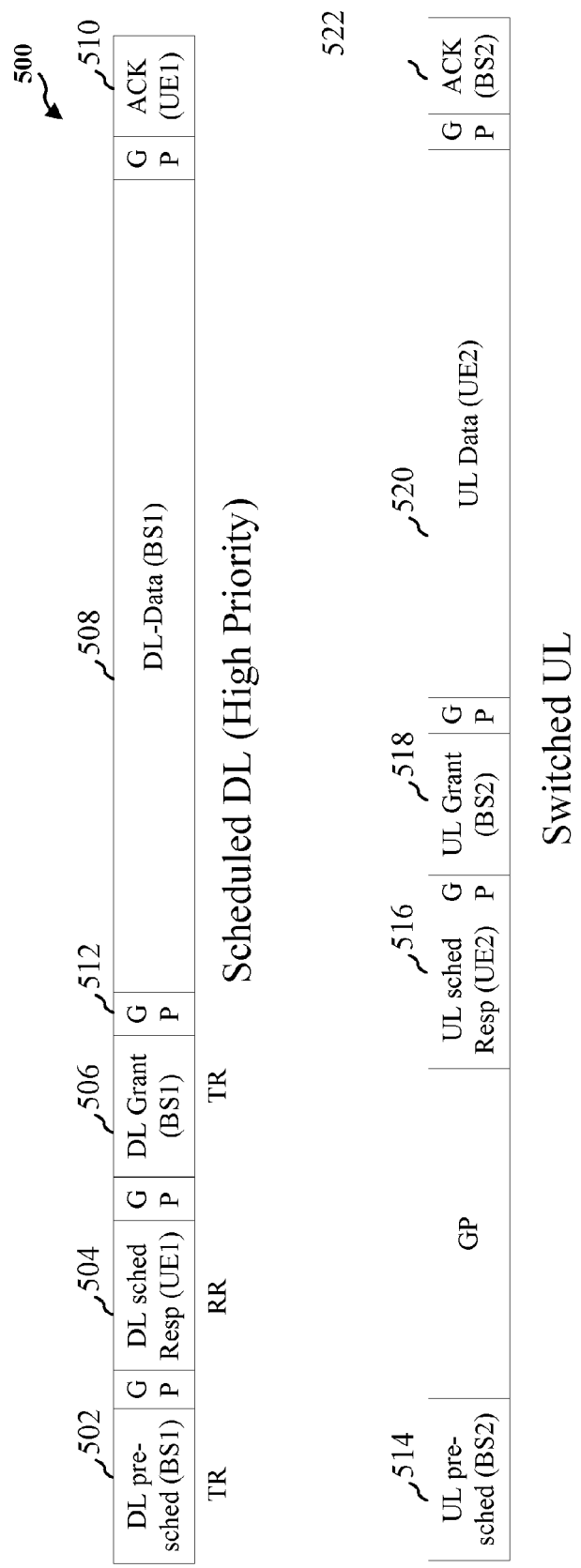
FIG. 5 is a diagram illustrating the subframe structures for a DL-to-UL switching example in accordance with an aspect of the disclosure.

FIG. 5 is a diagram illustrating two subframe structures 500 for a DL-to-UL switching example in accordance with an aspect of the disclosure. These subframe structures 500 may be utilized for wireless communication by any base stations and UEs, for example, those illustrated in FIGS. 1-4. In FIG. 5, the top subframe structure may be used for a scheduled (non-switched) DL connection, and the bottom subframe structure may be used for a DL-to-UL switched connection (switched UL). In one particular example, the base stations and UEs of FIG. 4 may utilize the subframe structures 500. In this example, the connection or communication link between a first base station 402 (BS1) and a first UE 404 (UE1) is a scheduled (non-switched) DL, and the connection or communication link between a second base station 406 (BS2) and a second UE 408 (UE2) is a switched UL. Initially, the scheduled (non-switched) DL may be of higher priority than the switched UL. For example, the scheduled DL may be of higher priority than the switched UL at a beginning portion of the subframe. Therefore, the base station 402 (BS2) and the first UE 404 (UE1) may not need to listen to the transmission of the switched UL connection, for example, the TR (transmitter request) and RR (receiver response) of the switched UL.

In FIG. 5, the subframe structure for the scheduled DL includes a DL pre-scheduling block 502, a DL scheduled response block 504, a DL grant block 506, DL data 508, and an acknowledgement (ACK) 510. The base station transmits the DL pre-scheduling block 502, DL grant block 506, and DL data 508. The UE transmits the DL scheduled response block 504 and ACK 510. In one aspect of the disclosure, the DL pre-scheduling block 502 and DL grant block 506 may serve as the TR of the non-switched DL, and the DL scheduling response block 504 may serve as the RR. Following the RR, the first base station 402 may transmit DL-data 508 to and receive an ACK 510 from the first UE 404. The various blocks of the scheduled DL connection may be separated by a guard period 512 (GP). For the switched UL connection, the second base station 406 informs the second UE 408 that this subframe is switched from DL to UL in an UL pre-scheduling block 514. Then the second base station 406 and/or the second UE 408 may listen to the TR and RR (e.g., pre-scheduling block 502, DL grant block 506, and DL scheduling response 504) of the scheduled DL to determine if the switched UL may need to yield to the non-switched DL.

In one aspect of the disclosure, a signal-to-interference ratio (SIR) (an UL-to-DL interference) at the first UE 404 (UE1) due to the switched UL may be determined based on the TR and RR of the DL connection, using a method similar to that described in relation to FIG. 3. The second base station 406 (BS2) and/or second UE 408 (UE2) may utilize the determined SIR at the first UE 404 to determine whether or not the UL connection yields to the DL connection. If no yielding is determined, the switched UL may perform uplink transmission while DL communication is ongoing. For example, the UL transmission may include an UL scheduling response block 516, an UL grant block 518, UL data 520, and UL ACK 522. In one example, if the SIR is greater than a certain threshold value, the switched UL may not yield to the scheduled DL. In one example, the threshold value may be 10 dB or other suitable values.

Figure 6:
FIG. 6 is a diagram illustrating the subframe structures for another DL-to-UL switching example in accordance with an aspect of the disclosure.

FIG. 6 is a diagram illustrating two subframe structures 600 for a DL-to-UL switching example in accordance with an aspect of the disclosure. These subframe structures 600 may be utilized for wireless communication by any base stations and UEs for example illustrated in of FIGS. 1-4. In FIG. 6, the top subframe structure may be used for a scheduled (non-switched) DL connection, and the bottom subframe structure for a DL-to-UL switched connection (e.g., switched UL 410 of FIG. 4). In one particular example, the subframe structures 600 may be utilized by the base stations and UEs of FIG. 4. In this example, the connection or communication link between a first base station 402 (BS1) and a first UE 404 (UE1) is a scheduled (non-switched) DL, and the connection or communication link between a second base station 406 (BS2) and a second UE 408 (UE2) is a switched UL. In this case, the switched UL connection may be of higher priority than the scheduled DL connection.

The DL subframe may include a DL pre-scheduling block 602, one or more DL scheduling response blocks 604, one or more DL grant blocks 606, DL data 606, and an acknowledgement (ACK) 608. The first base station 402 transmits the DL pre-scheduling response block 604, DL grant blocks 606, and DL data 606 to the first UE 404. The first UE 404 transmits DL scheduling responses 604 and ACK 608 to the first base station 402.

The switched UL subframe may include an UL pre-scheduling block 610, a scheduling response block 612, an UL scheduling response block 614, an UL grant block 616, UL data 618, and ACK. 620. As described in more detail below, the scheduling response block 612 is repurposed to send an override signal to the first base station 402 to override link priority. The second base station 406 transmits the UL pre-scheduling block 610 and UL grant block 616 to the second UE 408. The second UE 408 transmits the UL scheduling response block 614 to the second base station 406.

In one aspect of the disclosure, the switched UL may be utilized to transmit mission critical traffic, time-sensitive data, or other high priority data in a certain subframe, TTI, or time slot One example of high priority data may be mission critical data with strict delay constraints. In this example, the scheduled DL yields to the switched UL if the DL transmission of the first base station 402 may cause undesirable interference to the second base station 406 that is receiving UL transmission from the second UE 408. To let the DL base station knows that the switched UL is of higher priority, the switched UL base station may transmit a priority overriding signal (e.g., priority override 412 in FIG. 4) in a DL scheduling response block 612 to the DL base station. The priority overriding signal may also inform the receiving base station that the DL-to-UL switch occurred. The priority overriding signal may be sent using in-band signaling from the switched base station.

After receiving this priority override signal 412, the DL base station (first base station 402) becomes aware that there is a switched UL with higher priority. Therefore, the DL base station may inform the first UE 404 in a DL grant 606 that there is a switched UL with higher priority. For example, the DL grant 606 may include one or more bits that may be set to a certain value to indicate high priority For the switched UL, the second UE 408 transmits an uplink scheduling response 614, which may serve as a TR. In response, the UL base station transmits an uplink grant 616, which may serve as a RR. In the meantime, the DL base station (first base station 402) and/or the DL UE (first UE 404) may listen to the UL TR 614 and RR 616 signals to determine the interference (e.g., an SIR) at the second base station 406 due to the scheduled DL, using a method similar to that described in relation to FIG. 3. If the interference is greater than a certain threshold value, the DL connection yields to the UL. If no yielding is determined, the DL base station and its DL UE may continue or resume downlink transmission while the switched UL connection is ongoing (i.e., transmitting UL data). In one example, if the determined SIR at the second base station 406 is not greater than a certain threshold value, the DL connection yields to the switched UL. In one example, the threshold value may be 10 dB or other suitable values.

Figure 7:
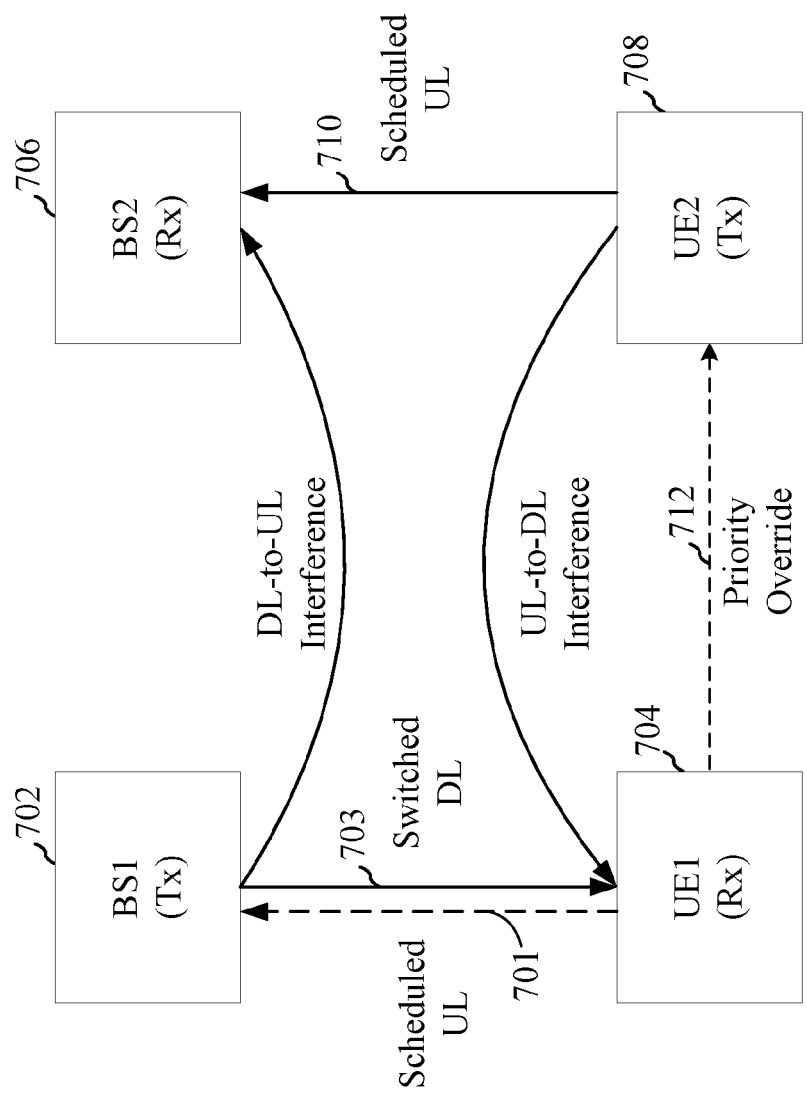
FIG. 7 is a diagram for illustrating an example of UL-to-DL switching and link priority management in accordance with some aspects of the disclosure.

FIG. 7 is a diagram for illustrating an example of UL-to-DL switching and link priority management in accordance with various aspects of the disclosure. In a certain subframe, TTI, or time slot, a first base station 702 has a scheduled (non-switched) UL connection 701 with a first UE 704, and a second base station 706 has a scheduled UL connection 710 with a second UE 708. Under certain conditions, the scheduled UL connection 701 may be switched to a switched DL connection 703 (switched DL). For example, the first UE 704 may not have data for UL transmission during a certain subframe so that UL-to-DL switching may be performed to increase spectral efficiency. In this example, the UL-to-DL switching may cause certain DL-to-UL interference and UL-to-DL interference between the base stations and UEs.

In one aspect of the disclosure, the switched link or connection (e.g., switched DL 703) may have lower or higher priority than the non-switched or scheduled link (e.g., scheduled UL 710). In some aspects of the disclosure, the priority order between the links or connections may be overridden in certain conditions. In some examples, if a low priority link has mission critical data, time-sensitive data, or other high priority data to transmit in a certain time slot or subframe, the high priority link with delay tolerant data or low priority data may yield to the low priority link (i.e., priority overridden).

Figure 8:
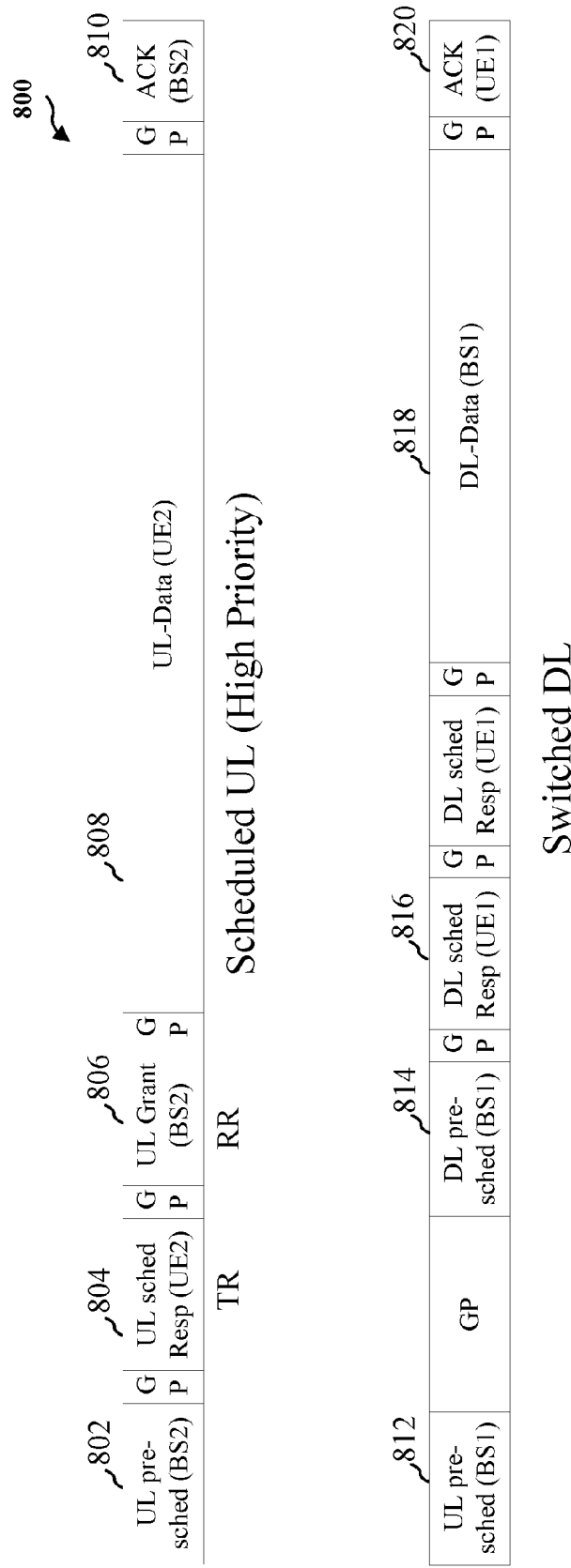
FIG. 8 is a diagram illustrating subframe structures for an UL-to-DL switching example in accordance with an aspect of the disclosure.

FIG. 8 is a diagram illustrating two subframe structures 800 for an UL-to-DL switching example in accordance with an aspect of the disclosure. These subframe structures 800 may be utilized by any base stations and UEs for example illustrated in of FIGS. 1-3 and 7. In one example, the subframe structures 800 may be utilized for a switched DL connection 703 (see FIG. 7) between a first base station 702 (BS1) and a first UE 704 (UE1), and a scheduled (non-switched) UL connection 710 between a second base station 706 (BS2) and a second UE 708 (UE2). The UL subframe structure may include an UL pre-scheduling block 802, an UL scheduling response block 804, an UL grant block 806, UL data 808, and an ACK 810. The DL subframe structure may include an UL pre-scheduling block 812, a DL pre-scheduling block 814, one or more DL scheduling response blocks 816, DL data 818, and an ACK 820.

In this example, the scheduled UL 710 is of higher priority. Therefore, the second base station 706 and the second UE 708 may not listen to the TR and RR signals of the switched DL 703. In one aspect of the disclosure, an uplink scheduling response block 804 and an UL grant block 806 may serve as the TR and RR, respectively, of the UL connection. For the switched DL, which is of lower priority, the first base station 702 informs the first UE 704 that this subframe is switched to DL in the UL uplink pre-scheduling block 812. Then the first base station 702 and/or its first UE 704 listen to the TR and RR (e.g., an uplink scheduling response block 804 and an UL grant block 806) of the scheduled UL to determine whether or not the switched DL yields to the scheduled UL based on the interference between the UL and DL.

In one aspect of the disclosure, the SIR (interference) at the second base station 706 due to the switched DL may be determined based on the TR and RR of the scheduled UL, using a method similar to that described in relation to FIG. 3. The first base station 702 and/or first UE 704 may utilize the SIR at the UL base station to determine whether or not the DL connection yields to the UL. If no yielding is determined, the switched DL may perform DL transmission while the UL transmission is ongoing. For example, if the SIR is greater than a predetermined threshold, the DL does not need to yield to the UL.

Figure 9:
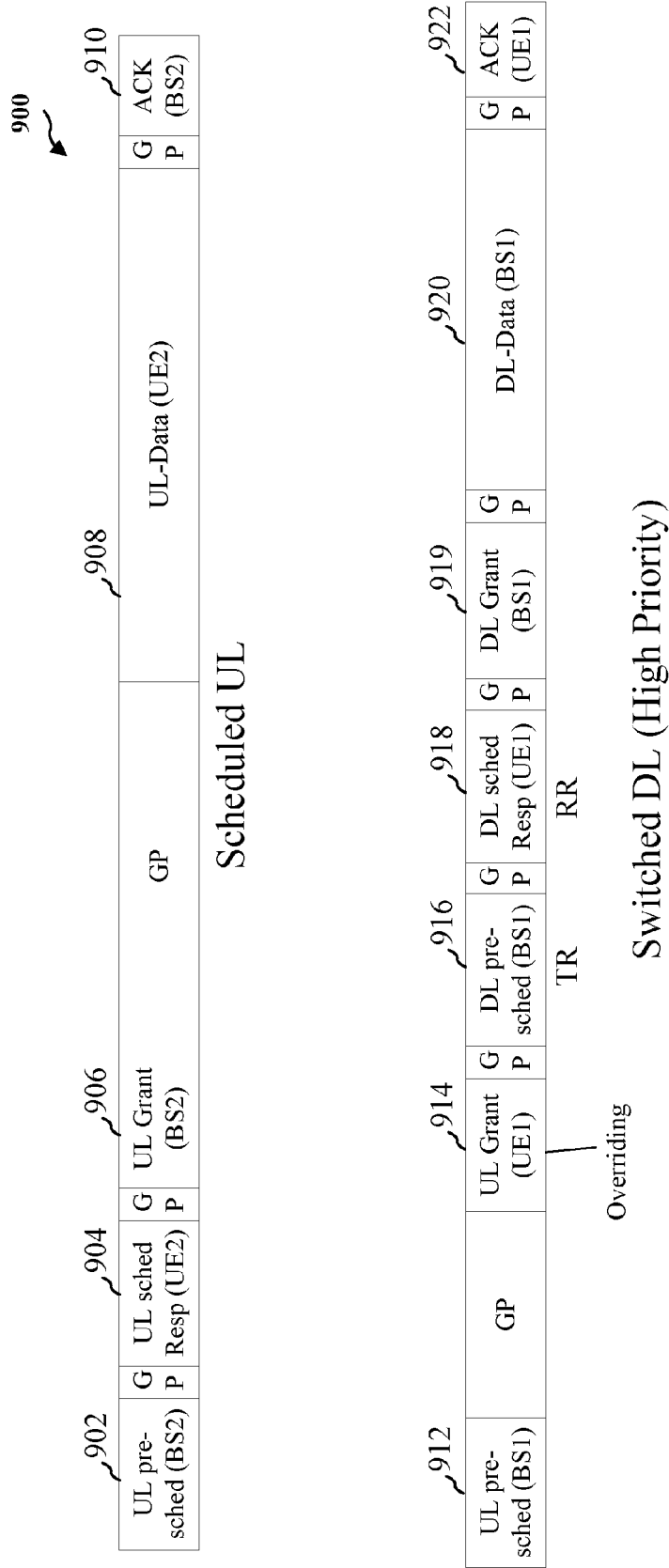
FIG. 9 is a diagram illustrating subframe structures for another UL-to-DL switching example in accordance with an aspect of the disclosure.

FIG. 9 is a diagram illustrating two subframe structures 900 for an UL-to-DL switching example in accordance with an aspect of the disclosure. These subframe structures 900 may be utilized by any base stations and UEs for example illustrated in of FIGS. 1-3 and 7. In one aspect of the disclosure, the DL subframe structure of FIG. 9 may be utilized for a switched DL connection between a first base station 702 (BS1) and a first UE 704 of FIG. 7, and the UL subframe structure of FIG. 9 may be utilized for a scheduled UL connection between a second base station 706 (BS2) and a second UE 708 (UE2) of FIG. 7. In this example, the switched DL connection has a higher priority than the scheduled (non-switched) UL connection. For example, the switched DL may be utilized to transmit mission critical traffic, time-sensitive data, or high priority data in a certain subframe, TTI, or time slot. Referring to FIG. 9, the UL subframe may include an UL pre-scheduling block 902, an UL scheduling response block 904, an UL grant block 906, UL data 908, and an ACK 910 for the UL data. The switched DL subframe may include an UL pre-scheduling block 912, an UL grant block 914, a DL pre-scheduling block 916, a DL scheduling response blocks 918, a DL grant block 919, DL data 920, and an ACK 922.

In one aspect of the disclosure, the scheduled UL may yield to the switched DL if the UL transmission will cause undesirable interference to the switched DL. To let the second UE 708 (UL UE) know that the switched DL is of a high priority, the first UE 704 (DL UE) may transmit a priority overriding signal (e.g., overriding signal 712 in FIG. 7) in the UL grant block 914 to the second UE 708. For example, the overriding signal may be in-band signaling. After receiving this overriding signal, the second UE 708 knows that there is a switched DL connection with a higher priority. In response, the second UE 708 may yield to the DL if an UL transmission may cause undesirable interference to the switched DL. The DL pre-scheduling block 916 transmitted by the first base station 702 may serve as the TR. In response to the TR, the first UE 704 transmits a DL scheduling response block 918, which may serve as the RR. In the meantime, the second UE 708 (UL UE) listens to the TR and/or RR signals to determine the interference between the UL and DL. If the interference is greater than a predetermined threshold, the scheduled UL yields to the switched DL. If no yielding is determined, the UL UE may continue or resume transmitting UL data while the DL transmission is ongoing.

Figure 10:
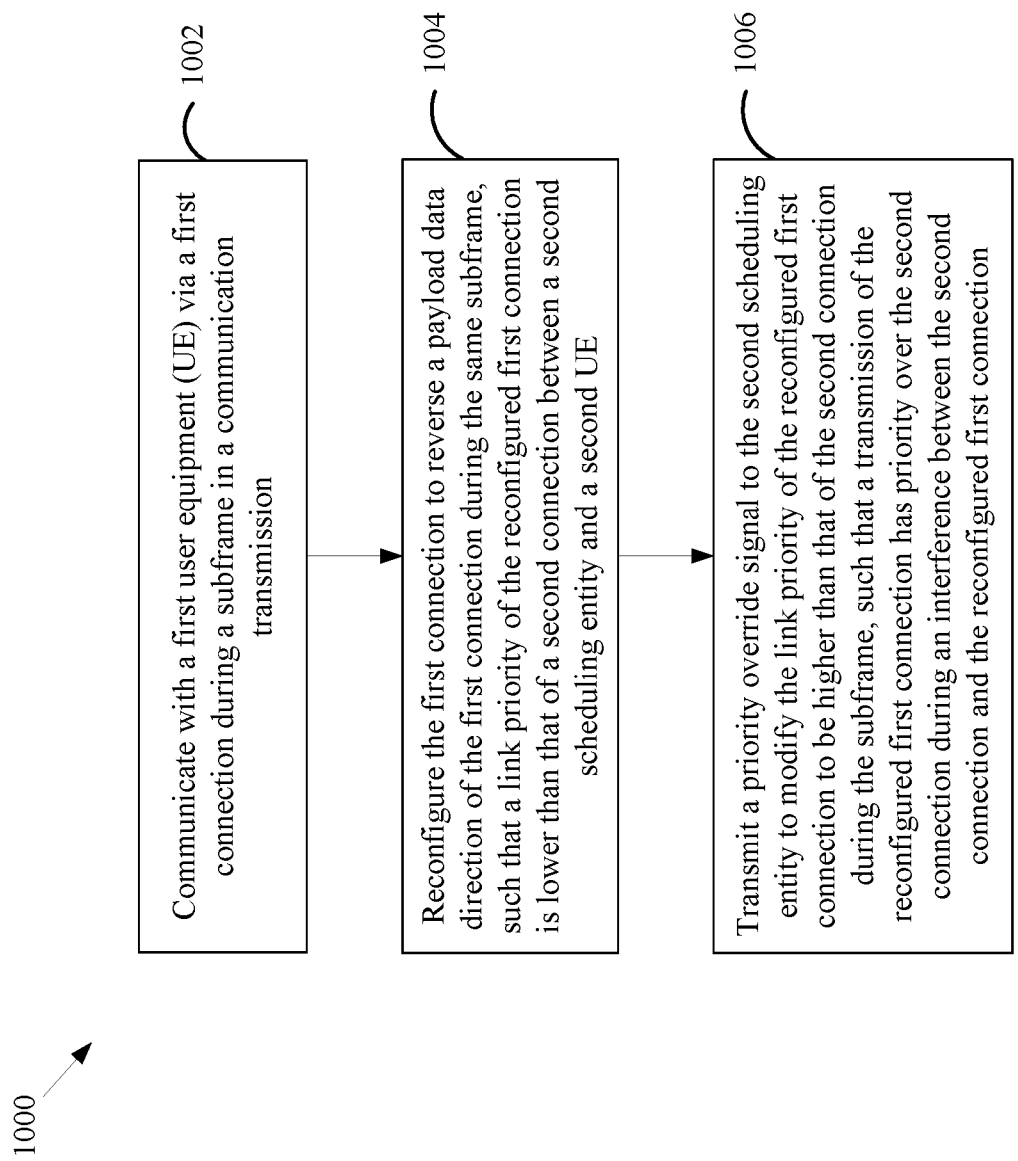
FIG. 10 is a flow chart illustrating a method of managing link priority of a switched uplink (UL) connection in accordance with an aspect of the disclosure.

FIG. 10 is a flow chart illustrating a method 1000 of managing interference between communication links based on link priority in accordance with an aspect of the disclosure. The method of FIG. 10 may be performed with any scheduling entities and UEs for example illustrated in FIG. 4. For example, a scheduling entity may be a base station, a P2P device or a mesh network device. At block 1002, a first scheduling entity (e.g., base station 406) communicates with a first UE (e.g., UE 408) via a first connection (e.g., scheduled DL 407) during a subframe in a communication transmission. During the same subframe, a second scheduling entity (e.g., base station 402) may communicate with a second UE (e.g., UE 404) via a second connection (e.g., scheduled DL 403). In one example, the first scheduling entity may utilize a wireless transceiver (e.g., transceiver 110 of FIG. 1) configured to communicate with the first UE.

At block 1004, the first scheduling entity reconfigures the first connection to reverse a payload data direction of the first connection during the same subframe, such that a link priority of the reconfigured first connection (e.g., switched UL 410) is initially lower than that of the second connection (e.g., scheduled DL 403) between the second scheduling entity and second UE. Reconfiguration of a connection (e.g., first connection) between a scheduling entity and a UE may include one or more exchanges of messages or signaling between the scheduling entity and the UE such that the scheduling may allocate, reallocate, remove, assign, and/or reassign resources of the scheduling entity and/or the UE to initiate, establish, maintain, and/or release the connection. The resources may include channels, carriers, signaling bearers, radio bearers, data bearers, radio access technology, modems, etc.

In one example, the first scheduling entity may reconfigure a scheduled DL connection 407 to a switched UL 410 such that the payload data direction is switched or reversed from DL data to UL data. In this case, the low priority reconfigured first connection (e.g., switched UL 410) yields to the high priority second connection (e.g., scheduled DL 403) if transmission of the low priority reconfigured first connection may cause significant or undesirable interference to the high priority second connection. In one example, the first scheduling entity may utilize a DL/UL switching block 122 of FIG. 1 configured to reconfigure the first connection to reverse a payload data direction (e.g., opposite traffic direction) of the connection. In one example, the reconfigured first connection (e.g., switched UL 410) and the second connection (e.g., scheduled DL 403) are time-synchronized in the same subframe.

At block 1006, the first scheduling entity (e.g., base station 406) transmits a priority override signal (e.g., priority override 412) to the second scheduling entity (e.g., base station 402) to modify (e.g., increase) the link priority of the reconfigured first connection to be higher than that of the second connection during the subframe, such that a transmission of the reconfigured first connection has priority over the second connection during an interference between the reconfigured first connection and the second connection. In one example, the first scheduling entity may utilize a priority overriding block (e.g., priority overriding block 124 of FIG. 1) configured to transmit a priority override signal to the second scheduling entity. In one aspect of the disclosure, the first scheduling entity may utilize the UL subframe structure 600 of FIG. 6 to communicate with the first UE, and the second scheduling entity may utilize the DL subframe structure 600 of FIG. 6 to communicate with the second UE.

Figure 11:
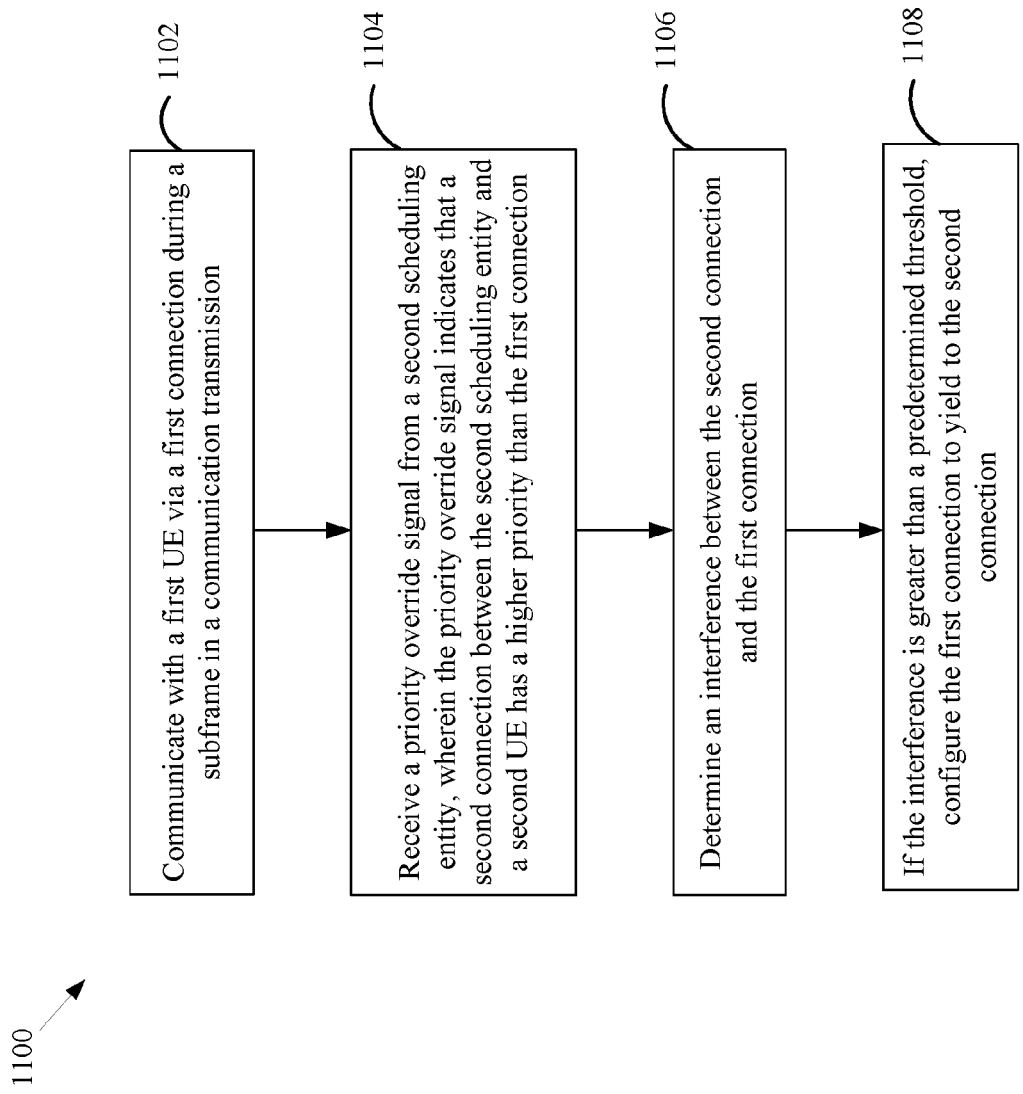
FIG. 11 is a flow chart illustrating a method of managing interference based on link priority in accordance with an aspect of the disclosure.

FIG. 11 is a flow chart illustrating a method 1100 of managing interference between communication links based on link priority in accordance with an aspect of the disclosure. The method 1100 may be performed with any scheduling entities and UEs for example illustrated in FIG. 4. For example, a scheduling entity may be a base station, a P2P device, or a mesh network device. At block 1102, a first scheduling entity 402 may utilize a transceiver 110 (see FIG. 1) to communicate with a first UE 404 via a first connection (e.g., first scheduled DL connection 403 or non-switched DL) during a subframe in a communication transmission. During the same subframe, a second scheduling entity 406 may communicate with a second UE 408 via a second connection (e.g., second scheduled DL connection 407). Initially, the first connection (e.g., first DL connection 403) may have a higher link priority than that of the second connection.

At block 1104, the first scheduling entity 402 may utilize the transceiver 110 to receive a priority override signal 412 from the second scheduling entity 406. The priority override signal may indicate that the second connection (e.g., DL connection 407) has been reconfigured in the same subframe to have a reversed payload data direction (e.g., opposite traffic direction), and the reconfigured second connection (e.g., switched UL connection 410) has a higher priority than the connection (e.g., DL connection 403). At block 1106, the first scheduling entity 402 may utilize an interference management block 120 (see FIG. 1) to determine an interference between the reconfigured second connection (e.g., switched UL connection 410) and the first connection (e.g., DL connection 403). For example, the scheduling entity 402 may utilize the TR and RR (e.g., TR 614 and RR 616 of FIG. 6) of the switched UL connection 410 (reconfigured second connection) to determine the interference (e.g., SIR) at the second scheduling entity 406 caused by the DL connection 403 (first connection). In one example, the interference may be an SIR that is determined using the method described above in relation to FIG. 3.

At block 1108, if the interference is greater than a predetermined threshold (e.g., SIR is less than a predetermined threshold), the first scheduling entity 402 may utilize a priority overriding block 124 (see FIG. 1) to configure the first connection (e.g., DL connection 403) to yield to the reconfigured second connection (e.g., switched UL connection 410). In one aspect of the disclosure, the first scheduling entity 402 may delay or suspend its transmission when it yields to the switched UL 410. In another example, the first scheduling entity 402 may reduce the transmission power of the DL connection when it yields to the switched UL 410.

Figure 12:
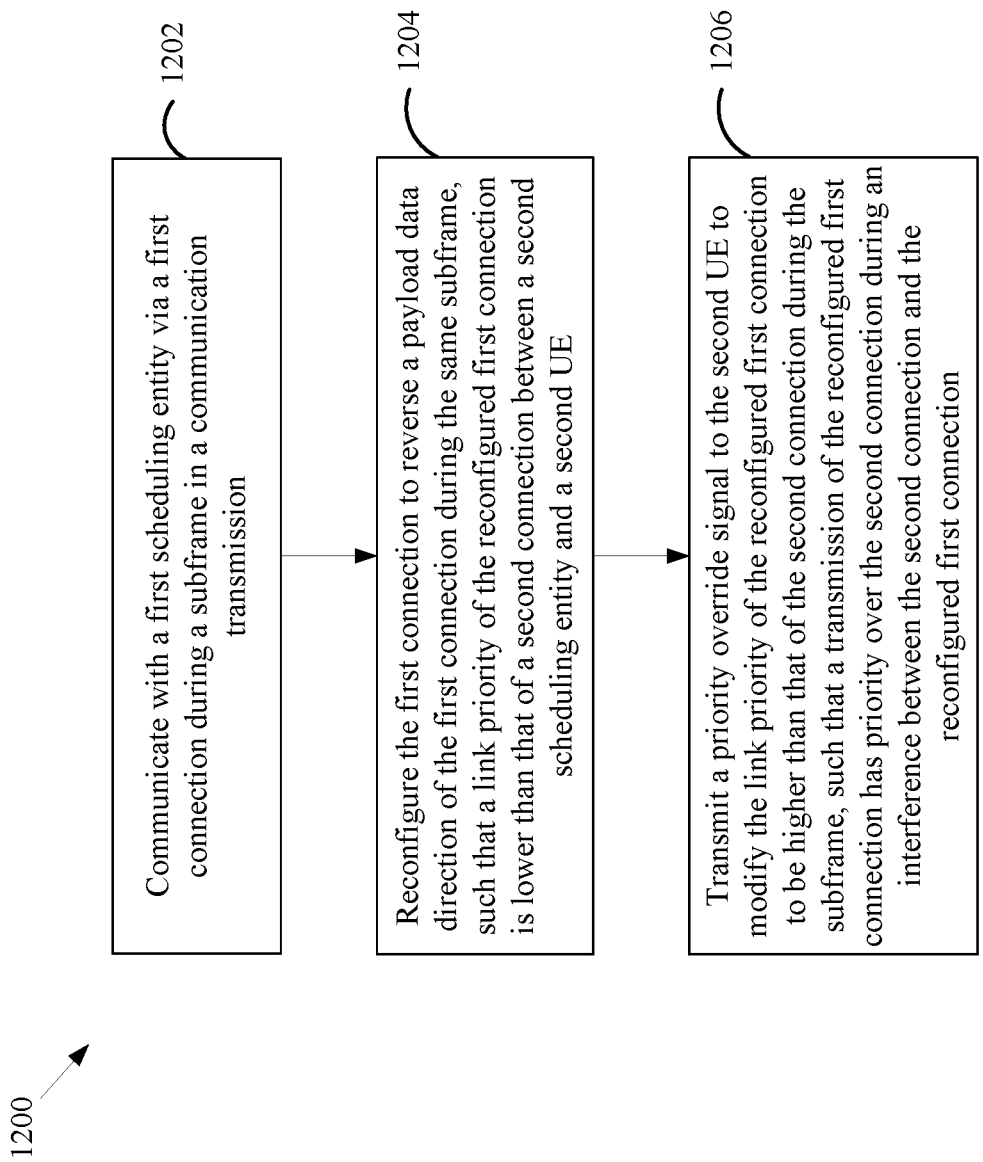
FIG. 12 is a flow chart illustrating a method of managing link priority of a switched DL connection in accordance with an aspect of the disclosure.

FIG. 12 is a flow chart illustrating a method 1200 of managing interference between communication links based on link priority in accordance with an aspect of the disclosure. The method 1200 may be performed using any UEs and scheduling entities for example illustrated in FIG. 7. For example, a scheduling entity may be a base station, a P2P device, or a mesh network device. At block 1202, a first UE 704 communicates with a first scheduling entity 702 via a first connection (e.g., scheduled UL connection 701) during a subframe in a communication transmission. During the same subframe, a second UE 708 may communicate with a second scheduling entity 706 via a second connection (e.g., UL connection 710 or scheduled UL). In one example, the first UE 704 may utilize a wireless transceiver (e.g., transceiver 110 of FIG. 1) configured to communicate with the first scheduling entity 702.

At block 1204, the first UE 704 reconfigures the first connection (e.g., scheduled UL connection 701) to reverse a payload data direction of the first connection during the same subframe, such that a link priority of the reconfigured first connection (e.g., switched DL connection 703) is initially lower than that of the second connection between the second scheduling entity 706 and second UE 708. Therefore, the low priority switched DL connection 703 yields to the high priority UL connection 710 if transmission of the low priority link may cause significant or undesirable interference to the high priority link. In one example, the first UE 704 may utilize a downlink/uplink switching block (e.g., DL/UL switching block 122 of FIG. 1) configured to reconfigure the connection (e.g., UL connection 701) to reverse its payload data direction (e.g., opposite traffic direction). In one example, the reconfigured first connection (e.g., switched DL connection 703) and the second connection (e.g., UL connection 710) are time-synchronized in the same subframe.

At block 1206, the first UE 704 transmits a priority override signal 712 to the second UE 708 to modify (e.g., increase) the link priority of the reconfigured first connection (e.g., switched DL connection 703) to be higher than that of the second connection (e.g., UL connection 710) during the same subframe, such that a transmission of the reconfigured first connection has priority over the second connection based on an interference between the second connection and reconfigured first connection. In one example, the first UE 704 may utilize a priority overriding block (e.g., priority overriding block 124 of FIG. 1) configured to transmit a priority override signal to the second UE 708. In one aspect of the disclosure, the first UE 704 may utilize the DL subframe structure of FIG. 9 to communicate with the first scheduling entity 702, and the second UE 708 may utilize the UL subframe structure of FIG. 9 to communicate with the second scheduling entity 706.

Figure 13:
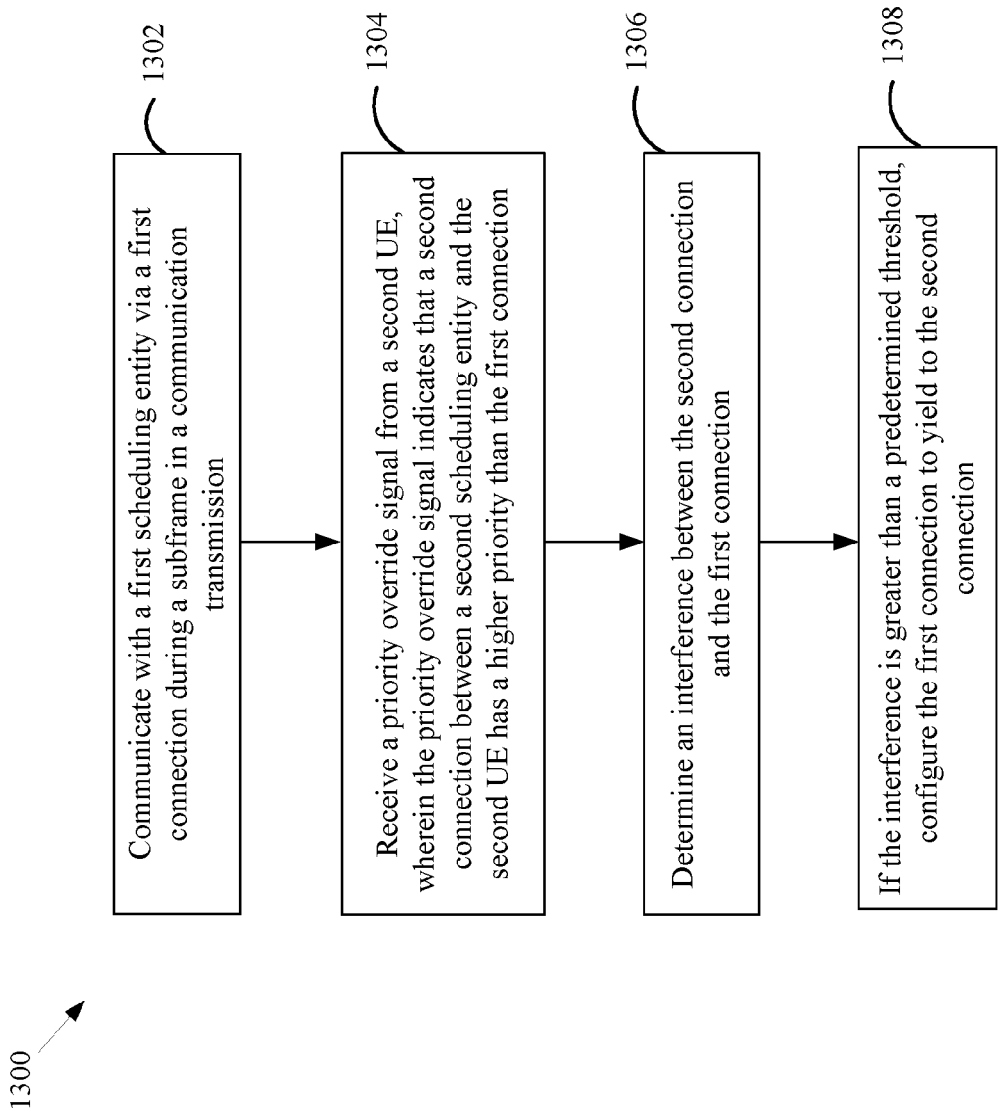
FIG. 13 is a flow chart illustrating a method of managing interference based on link priority in accordance with an aspect of the disclosure.

FIG. 13 is a flow chart illustrating a method 1300 of managing interference between communication links based on link priority in accordance with an aspect of the disclosure. The method 1300 may be performed by any scheduling entities and UEs for example illustrated in FIG. 7. For example, a scheduling entity may be a base station, a P2P device, or a mesh network device. At block 1302, a first UE 708 (UE2) may utilize a transceiver 110 (see FIG. 1) to communicate with a first scheduling entity 706 (e.g., BS2) via a first connection (e.g., scheduled UL connection 710 or non-switched UL) during a subframe in a communication transmission. During the same subframe, a second UE 704 may communicate with a second scheduling entity 702 via a second connection (e.g., scheduled UL connection 701) during the same subframe. Initially, the first connection (e.g., UL connection 710) has a higher link priority than that of the second connection (e.g., scheduled UL connection 701).

At block 1304, the first UE 708 may utilize the transceiver 110 to receive a priority override signal 712 from the second UE 704. The priority override signal may indicate that the second connection (e.g., scheduled UL connection 701) has been reconfigured such that the second connection has a reversed payload data direction (e.g., opposite traffic direction), and the reconfigured second connection (e.g., switched DL connection 703) has a higher priority than the first connection (e.g., scheduled UL connection 710). At block 1306, the first UE 708 may utilize an interference management block 120 (see FIG. 1) to determine an interference between the reconfigured second connection (e.g., switched DL connection 703) and the first connection (e.g., scheduled UL connection 710). For example, the first UE 708 may utilize the TR and RR (e.g., TR 916 and RR 918 of FIG. 9) of the switched DL connection 703 to determine the interference at the second UE 704 caused by the scheduled UL connection 710. In one example, the interference may be an SIR that is determined using the method described above in relation to FIG. 3.

At block 1308, if the interference is greater than a predetermined threshold (e.g., SIR is less than a predetermined threshold), the first UE 708 may utilize a priority overriding block 124 (see FIG. 1) to configure the first connection (e.g., UL connection 710) to yield to the reconfigured second connection (e.g., switched DL connection 703). In one aspect of the disclosure, the first UE 708 may delay or suspend its transmission when it yields to the switched DL 703. In another example, the first UE 708 may reduce the transmission power of the scheduled UL connection 710 when it yields to the switched DL 703.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

What is claimed is:

1. A method of wireless communication utilizing a scheduling entity, the method comprising:
   communicating with a first user equipment (UE) via a first connection during a subframe in a communication transmission;
   reconfiguring the first connection to reverse a payload data direction of the first connection during the same subframe, such that a link priority of the reconfigured first connection is lower than that of a second connection between a second scheduling entity and a second UE; and
   transmitting a priority override signal to the second scheduling entity to modify the link priority of the reconfigured first connection to be higher than that of the second connection during the subframe, such that a transmission of the reconfigured first connection has priority over the second connection during an interference between the second connection and reconfigured first connection.

2. The method of claim 1, further comprising:
   transmitting a transmitter request (TR) to the first UE during the subframe; and
   receiving a receiver response (RR) corresponding to the TR during the subframe,
   wherein the TR and RR are configured to be utilized by the second scheduling entity to determine an interference to the reconfigured first connection caused by a transmission of the second connection.

3. The method of claim 1, wherein the reconfigured first connection and the second connection are synchronized in the same subframe.

4. The method of claim 1, further comprising:
   during the same subframe:
   transmitting a pre-scheduling block to the first UE;
   transmitting the priority override signal to the second scheduling entity;
   receiving a scheduling response from the first UE; and
   transmitting a grant block to the first UE.

5. The method of claim 1, wherein the transmitting a priority override signal comprises:
   transmitting the priority override signal if the reconfigured connection is configured to transmit at least one of mission critical traffic, time-sensitive data, or high priority data.

6. The method of claim 1,
   wherein the first connection comprises a downlink (DL) connection, and the reconfigured first connection comprises a switched uplink (UL) connection, and wherein the second connection comprises a DL connection.

7. The method of claim 4, wherein the pre-scheduling block comprises an UL pre-scheduling block, and the scheduling response comprises an UL scheduling response.

8. A method of wireless communication utilizing a user equipment, the method comprising:
   communicating with a scheduling entity via a first connection during a subframe in a communication transmission;
   reconfiguring the first connection to reverse a payload data direction of the first connection during the same subframe, such that a link priority of the reconfigured. first connection is lower than that of a second connection between a second scheduling entity and a second user equipment (UE); and
   transmitting a priority override signal to the second UE to modify the link priority of the reconfigured first connection to be higher than that of the second connection during the subframe, such that a transmission of the reconfigured first connection has priority over the second connection during an interference between the second connection and reconfigured connection.

9. The method of claim 8, further comprising:
   receiving a transmitter request (TR) from the first scheduling entity during the subframe; and
   transmitting a receiver response (RR) corresponding to the TR during the subframe,
   wherein the TR and RR are configured to be utilized by the second UE to determine an interference to the reconfigured first connection caused by a transmission of the second connection.

10. The method of claim 8, wherein the reconfigured connection and the second connection are synchronized in the same subframe.

11. The method of claim 8, further comprising:
   during the same subframe:
   receiving a first pre-scheduling block from the first scheduling entity;
   transmitting the priority override signal to the second UE;
   receiving a second pre-scheduling block from the first scheduling entity; and
   transmitting a scheduling response block to the first scheduling entity.

12. The method of claim 8, wherein the transmitting a priority override signal comprises:
   transmitting the priority override signal if the reconfigured first connection is configured to transmit at least one of mission critical traffic, time-sensitive data, or high priority data.

13. The method of claim 8,
   wherein the first connection comprises an uplink (UL) connection, and the reconfigured first connection comprises a switched downlink (DL) connection, and wherein the second connection comprises an UL connection.

14. The method of claim 11, wherein the pre-scheduling block comprises an UL pre-scheduling block, and the second pre-scheduling block comprises a DL pre-scheduling block.

15. A scheduling entity comprising:
a communication interface configured to communicate with a first user equipment (UE);
a memory configured to store executable code; and
at least one processor operatively coupled to the communication interface and memory,
wherein the processor is configured by the executable code to:
communicate with the first UE via a first connection during a subframe in a communication transmission;
reconfigure the first connection to reverse a payload data direction of the first connection during the same subframe, such that a link priority of the reconfigured first connection is lower than that of a second connection between a second scheduling entity and a second UE; and
transmit a priority override signal to the second scheduling entity to modify the link priority of the reconfigured first connection to be higher than that of the second connection during the subframe, such that a transmission of the reconfigured. first connection has priority over the second connection during an interference between the second connection and reconfigured first connection.

16. The scheduling entity of claim 15, wherein the processor is further configured to:
transmit a transmitter request (TR) to the first UE during the subframe; and
receive a receiver response (RR) corresponding to the TR during the subframe,
wherein the TR and RR are configured to be utilized by the second scheduling entity to determine an interference to the reconfigured first connection caused by a transmission of the second connection.

17. The scheduling entity of claim 15, wherein the reconfigured first connection and the second connection are synchronized in the same subframe.

18. The scheduling entity of claim 15, wherein the processor is further configured to:
during the same subframe:
transmit a pre-scheduling block to the first UE;
transmit the priority override signal to the second scheduling entity;
receive a scheduling response from the first UE; and
transmit a grant block to the first UE.

19. The scheduling entity of claim 15, wherein the processor is further configured to:
transmit the priority override signal if the reconfigured first connection is configured to transmit at least one of mission critical traffic, time-sensitive data, or high priority data.

20. The scheduling entity of claim 15,
wherein the first connection comprises a downlink (DL) connection, and the reconfigured first connection comprises a switched uplink (UL) connection, and
wherein the second connection comprises a DL connection.

21. The scheduling entity of claim 18, wherein the pre-scheduling block comprises an UL pre-scheduling block, and the scheduling response comprises an UL scheduling response.

22. A user equipment (UE) comprising:
a communication interface configured to communicate with a first scheduling entity;
a memory configured to store executable code; and
at least one processor operatively coupled to the communication interface and memory,
wherein the at least one processor is configured to:
communicate with the first scheduling entity via a first connection during a subframe in a communication transmission;
reconfigure the first connection to reverse a payload data direction of the first connection during the same subframe, such that a link priority of the reconfigured first connection is lower than that of a second connection between a second scheduling entity and a second UE; and
transmit a priority override signal to the second UE to modify the link priority of the reconfigured first connection to be higher than that of the second connection during the subframe such that a transmission of the reconfigured first connection has priority over the second connection during an interference between the second connection and reconfigured first connection.

23. The user equipment of claim 22, wherein the processor is further configured to:
receive a transmitter request (TR) from the first scheduling entity during the subframe; and
transmit a receiver response (RR) corresponding to the TR during the subframe,
wherein the TR and RR are configured to be utilized by the second UE to determine an interference to the reconfigured first connection caused by a transmission of the second connection.

24. The user equipment of claim 22, wherein the reconfigured first connection and the second connection are synchronized in the same subframe.

25. The user equipment of claim 22, wherein the processor is further configured to:
during the same subframe:
receive a first pre-scheduling block from the first scheduling entity;
transmit the priority overriding signal to the second UE;
receive a second pre-scheduling block from the first scheduling entity; and
transmit a scheduling response block to the first scheduling entity.

26. The user equipment of claim 22, wherein the processor is further configured to:
transmit the priority override signal if the reconfigured first connection is configured to transmit at least one of mission critical traffic, time-sensitive data, or high priority data.

27. The user equipment of claim 22,
wherein the first connection comprises an uplink (UL) connection, and the reconfigured first connection comprises a switched downlink (DL) connection, and
wherein the second connection comprises an UL connection.

28. The user equipment of claim 25, wherein the first pre-scheduling block comprises an UL pre-scheduling block, and the second pre-scheduling block comprises a DL pre-scheduling block.

* * * * *